Nov. 4, 1958  J. FISHER, JR  2,859,326

ELECTRIC PORTABLE HOT WATER HEATER

Filed Oct. 30, 1957

INVENTOR.

JOHN FISHER, JR.

United States Patent Office 2,859,326
Patented Nov. 4, 1958

2,859,326

ELECTRIC PORTABLE HOT WATER HEATER

John Fisher, Jr., Milwaukee, Wis.

Application October 30, 1957, Serial No. 693,423

3 Claims. (Cl. 219—38)

This invention relates to plumbing fixtures and more particularly to a portable hot water heater.

It is an object of the present invention to provide a hot water heater that may be readily used with any source of cold water for automatically heating the water at it is consumed.

Another object of the present invention is to provide a portable hot water heater of the above type that is completely self contained and has a manually operable discharge faucet for removing heated water therefrom.

Other objects of the invention are to provide an electric portable hot water heater bearing the above objects in mind which is of simple construction, has a minimum number of parts, is inexpensive to manufacture and efficient in operation.

For other objects and for a better understanding of the invention, reference may be had to the following detailed description taken in conjunction with the accompanying drawing, in which.

Figure 1:
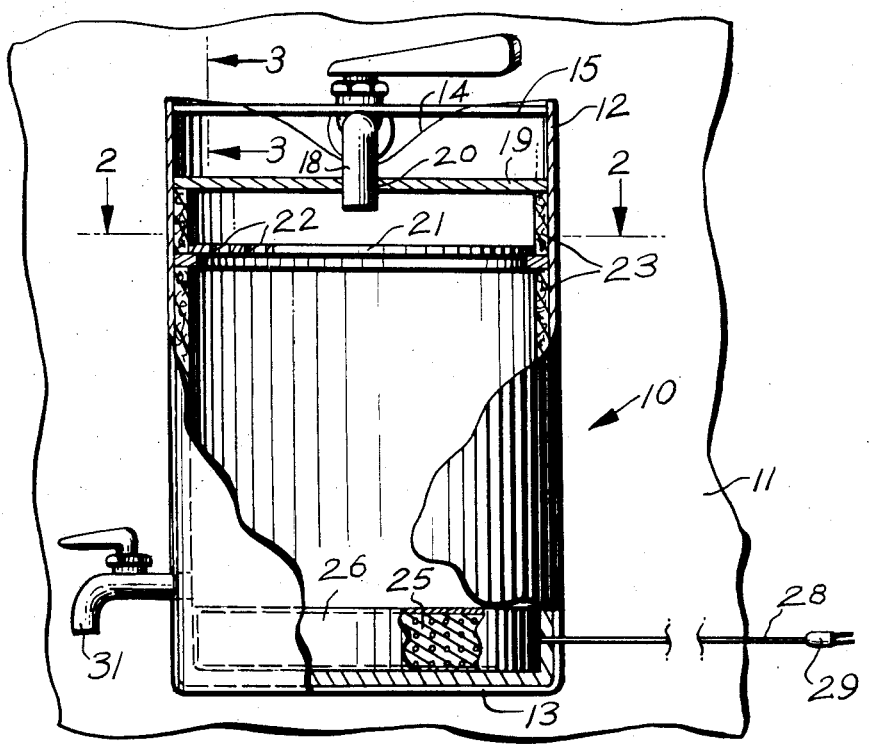
Figure 1 is a front elevational view, with parts broken away, of an electric portable hot water heater made in accordance with the present invention in operative use.
Figure 2:
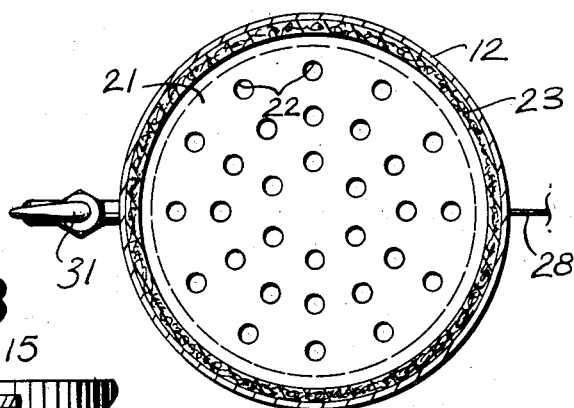
Figure 2 is a transverse cross sectional view taken along line 2—2 of Figure 1.
Figure 3:
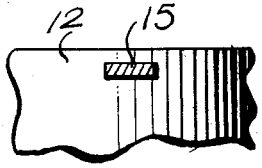
Figure 3 is a fragmentary cross sectional view taken along line 3—3 of Figure 1.

Referring now more in detail to the drawing, an electric portable hot water heater 10 made in accordance with the present invention is shown in operative use within a sink 11. This unit includes a cylindrical container having a cylindrical side wall 12, a bottom wall 13, and a top wall 19 which is spaced inwardly from the upper extremity of the side wall 12 so as to define an upwardly extending terminal collar portion. A support rod or bar 15 extends transversely across the terminal collar portion for supporting the container upon the cold water faucet 18 of the sink 11, the rearmost portion of this collar defining a cutout 14 for accommodating the adjacent portions of this faucet.

The upper closure wall 19 is provided with a single central opening 20 for snugly receiving the downwardly depending spout of the faucet. A water control device in the form of a perforated plate 21 is disposed within the container below the inlet opening 20 of the top closure wall 19. This plate 21 is provided with a plurality of holes 22 which control the flow of cold water from the faucet 18 into the lower portions of the container. At the bottom of the container, a compartment 26 is provided which is waterproof and contains the heating elements 25 of the unit. All of the other interior surfaces of the container are provided with a layer of insulation 23 for preventing the wasteful loss of heat outwardly through the side walls thereof.

An electric supply line 28 having a male plug 29 at one end for connection to a source of electrical energy extends into operative association with the heating elements 25 so as to produce sufficient heat within the container to rapidly heat water passing into contact therewith. A discharge faucet 31 having a manually operable valve is disposed adjacent to the lowermost portions of the container for metering out the heated water therefrom.

It will thus be recognized that this unit may be readily carried from one location to another so as to provide an instant source of heated water whenever desired. All that is necessary is a source of cold water and a source of electrical energy, whereby a sufficient quantity of hot water is always available for domestic, business, and industrial purposes.

While various changes may be made in the detail construction, it shall be understood that such changes shall be within the spirit and scope of the present invention as defined by the appended claims.

What I claim as new and desire to protect by Letters Patent of the United States is:

1. An electric portable hot water heater comprising, in combination, a cylindrical container having a closed bottom and an open top, a closure wall closing said open top of said container spaced inwardly from the upper terminal portion thereof, a cut out opening in said closure wall for receiving the spout of a cold water faucet, a water control member spaced beneath said closure wall, a heater unit carried within the bottom of said container, and a discharge faucet in communication with the bottom of said container, said upper terminal portion of said container defining an upwardly extending and upwardly opening collar, a transverse bar extending across said collar for supporting said container upon a cold water faucet, and said water control member comprising a substantially flat circular perforated plate.

2. The combination according to claim 1, wherein said heater unit comprises a waterproof compartment, heating elements within said compartment, and electrical supply means connected to said heating elements.

3. The combination according to claim 2, wherein said collar includes a cutout for receiving said cold water faucet.

References Cited in the file of this patent

UNITED STATES PATENTS

| | | |
|---|---|---|
| 1,494,207 | Bastian | May 13, 1924 |
| 2,062,721 | Le Rouge | Dec. 1, 1936 |
| 2,392,208 | Wilken | Jan. 1, 1946 |
| 2,435,981 | Rawson | Feb. 17, 1948 |